United States Patent [19]

Parker et al.

[11] Patent Number: 6,007,154

[45] Date of Patent: Dec. 28, 1999

[54] FOUR-WAY ARTICULATING HEADREST SYSTEM FOR AUTOMOTIVE SEATS

[75] Inventors: Eric G. Parker, Elgin, Ill.; Craig L. Simdon, Cambridge, Wis.

[73] Assignee: Illinois Tool Works Inc., Glenview, Ill.

[21] Appl. No.: 08/714,248

[22] Filed: Sep. 16, 1996

[51] Int. Cl.$^6$ ............................... A47C 7/36; B60N 2/48
[52] U.S. Cl. ........................................ 297/410; 297/408
[58] Field of Search .................................. 297/408, 410, 297/391

[56] References Cited

U.S. PATENT DOCUMENTS

| | | | |
|---|---|---|---|
| 4,256,341 | 3/1981 | Göldner et al. | 297/408 |
| 4,779,929 | 10/1988 | Küchemann | 297/410 |
| 5,180,207 | 1/1993 | Schmidt | 297/408 |
| 5,199,765 | 4/1993 | Garmendia et al. | 297/410 |

Primary Examiner—Peter M. Cuomo
Assistant Examiner—Anthony D. Barfield
Attorney, Agent, or Firm—Schwartz & Weinrieb

[57] ABSTRACT

An automotive vehicle headrest system comprises a pair of laterally spaced upstanding support shafts or bolt members for threaded engagement within internally threaded or tapped holes, sockets, or sleeves defined within an automotive vehicle seat frame. The headrest component includes bracket members, having disk members incorporated therein, which are mounted upon the shafts or bolts such that the bracket/disk assemblies are normally mis-aligned with respect to each other, and the disk members define two-point contact systems with the shaft or bolts so as to support the headrest at a predetermined elevational position. Vertical positional adjustment of the headrest is achieved by causing the bracket members to be aligned with each other thereby releasing the two-point contact system defined with the shafts or bolts whereupon movement of the headrest to a new elevational position, the two-point contact system is re-established so as to again permit support of the headrest upon the support shafts or bolt members.

20 Claims, 7 Drawing Sheets

FOUR-WAY ARTICULATING HEADREST SYSTEM FOR AUTOMOTIVE SEATS

FIELD OF THE INVENTION

The present invention relates generally to automotive headrests, and more particularly to a new and improved four-way articulating headrest system for automotive seats.

BACKGROUND OF THE INVENTION

Adjustable headrest systems within automotive vehicles are of course well-known. However, due to dimensional tolerancing or characteristic requirements of both the manufacturing and assembly operations, the automotive headrest components or assemblies of such headrest systems are sometimes difficult to assemble or mount upon, or insert into, the upper portions of the automotive seat frames. In addition, once the headrest components or assemblies of such systems are in fact so assembled or mounted upon, or inserted into, the upper portions of the automotive seat frames, the headrest components or assemblies may also be somewhat difficult to adjust to particular positions or orientations, with respect to the automotive vehicle seats, as may be desired by the automotive drivers or passengers.

In connection with the adjustment of such conventional headrest components or assemblies wherein the headrest components or assemblies are disposed at particularly desired positions or orientations with respect to the automotive vehicle seats, it is also characteristic of such conventional automotive headrest systems that the entire headrest component or assembly, including the vertical shafts upon which the headrest members are supported and which in turn are inserted within the upper portions of the automotive seats, are required to be adjusted with respect to the upper portions of the automotive seats. An adjustment mechanism is usually provided upon the upper exterior or outer surface portions of the vehicle seats so as to permit adjustment of the vehicle headrest components or assemblies with respect to the vehicle seats, however, this adjustment process often proves to be somewhat difficult, unwieldy, and cumbersome due to the fact that the vehicle passenger or driver must use one hand to operate the adjustment or release mechanism upon the vehicle seat while the other hand is used to grasp the vehicle headrest component or assembly and adjustably move the same to the desired position or orientation while the vehicle seat adjustment mechanism is maintained in its released position.

A need therefore exists in the art for a new and improved headrest system for automotive vehicle seats which inherently compensates for tolerances or interactive dimensions between the various members of the system which facilitate or enable the automotive vehicle headrest components or assemblies to be readily and easily mounted or assembled upon, or inserted into, the upper portions of the automotive seats, and which furthermore facilitates or enables the automotive vehicle headrest members to be readily and easily adjusted to particularly desired positions or orientations with respect to the automotive vehicle seats.

OBJECTS OF THE INVENTION

Accordingly, it is an object of the present invention to provide a new and improved headrest system for automotive vehicle seats.

Another object of the present invention is to provide a new and improved headrest system for automotive vehicle seats which will overcome the various disadvantages and drawbacks characteristic of conventional or prior art automotive vehicle headrest systems.

A further object of the present invention is to provide a new and improved headrest system for automotive vehicle seats which inherently compensates for tolerances or interactive dimensions between the various members of the system which facilitate or enable the automotive vehicle headrest components or assemblies to be readily and easily mounted or assembled upon, or inserted into, the upper portions of the automotive seats, and which furthermore facilitates or enables the automotive vehicle headrest members to be readily and easily adjusted to particularly desired positions or orientations with respect to the automotive vehicle seats.

SUMMARY OF THE INVENTION

The foregoing and other objectives are achieved in accordance with the present invention through the provision of a headrest system for automotive vehicle seats which comprises a pair of bracket members each of which has a substantially L-shaped configuration and which comprises an upstanding ear or channel portion and a horizontally extending base or central portion wherein such base or central portions are pivotally interconnected to each other, in a preferred embodiment, by means of an array or series of interdigitated fingers such that the upstanding ear or channel portions are laterally spaced from each other. Support shafts, in the form of bolt members, having externally threaded portions upon the lower end regions thereof for threaded engagement with internally threaded sockets or sleeves provided within the automotive vehicle seat frame, are movably disposed within the upstanding ears or channel portions of the bracket members so as to permit vertical adjustment of the headrest member, in both the upward and downward directions, with respect to such bolt members or support shafts and the associated automotive vehicle seat.

Non-threaded shank portions of the support shafts or bolt members are movably disposed within disk members which have a diametrically oriented channel or slot defined therein for passage therethrough of the non-threaded shank portions of the support shafts or bolt members. The diametrically oriented channel or slot defined within each disk member has a diametrical extent or dimension which is greater than the diametrical extent or dimension of the non-threaded shank portion of each support shaft or bolt member such that the non-threaded shank portion of each support shaft or bolt member is disposed relatively loosely within its associated channel or slot defined within the associated disk member.

The bracket members are normally disposed such that the upstanding ears or channel portions are not parallel to each other, and the horizontally extending central portions are disposed in a skewed or misaligned orientation with respect to each other. Consequently, when the support shafts or bolt members have their threaded lower end portions threadedly engaged within the threaded sockets or sleeves of the automotive vehicle seat frame, the support shafts or bolt members are disposed in a skewed or misaligned orientation with respect to the disk members as permitted by means of the disparity defined between the diametrical dimensions or extents of the non-threaded shank portions of the support shafts or bolt members and the associated channels or slots defined within the disk members. In this manner, each support shaft or bolt member is disposed in contact with its associated disk member at two diametrically opposite points of contact which permits the automotive headrest member, through means of the bracket members, to be vertically disposed at a particular vertical position with respect to the vertically disposed or upstanding support shafts or bolt members of the automotive vehicle seat frame. When the vertical disposition of the automotive headrest member is desired to be vertically adjusted either upwardly or downwardly, forces are applied to the bracket members such that the horizontally extending central portions thereof are urged into an aligned disposition with respect to each other whereby the disk members will now be essentially coaxially aligned with the support shafts or bolt members thereby, in effect, eliminating the two point contact disposition previously defined between each support shaft or bolt member and its associated disk member. In this manner, the headrest member, through means of the bracket members, is able to be freely adjusted relative to the support shafts or bolt members whereupon being moved to the desired vertical position relative to the automotive seat, the forces applied to the bracket members are removed or released therefrom so as to permit the horizontally extending central portions of the bracket members to again attain their misaligned disposition with respect to each other whereby the two-point contact originally defined between the bolt members or support shafts and the associated disk members is re-established so as to retain the headrest member at the newly adjusted position.

Each of the disk members is also rotatably or pivotally disposed within the upstanding ear or channel portions of the bracket members, and in this manner, the automotive headrest member may be pivotally adjusted in both forward and backward modes. As a result of the vertical adjustment of the headrest member with respect to the automotive seat, as well as the pivotal adjustment of the headrest member with respect to the automotive seat, the headrest assembly or system of the present invention comprises a four-way articulated headrest system which is provided with movements which encompass four degrees of freedom.

BRIEF DESCRIPTION OF THE DRAWINGS

Various other objects, features, and attendant advantages of the present invention will be more fully appreciated from the following detailed description when considered in connection with the accompanying drawings in which like or corresponding parts are designated by like or corresponding reference numerals throughout the several views, and wherein.

DETAILED DESCRIPTION OF THE ILLUSTRATED EMBODIMENTS

Referring now to the drawings and more particularly to FIGS. 1–3b thereof, the new and improved automotive vehicle headrest system constructed in accordance with the principles and teachings of the present invention is generally indicated by the reference character 10 and is seen to comprise a pair of bracket members 12. Each one of the bracket members 12 has a substantially L-shaped configuration, as may be considered in a vertical cross-sectional view, and is seen to comprise an upstanding ear or channel portion 14 and a horizontally extending base or central portion 16 such that when the bracket members 12,12 of the headrest system 10 are assembled together as best seen or appreciated from FIG. 1 of the drawings, the entire bracket assembly has a substantially rabbit-ear configuration or arrangement with the upstanding ear or channel portions 14,14 being laterally spaced with respect to each other.

Figure 3A:
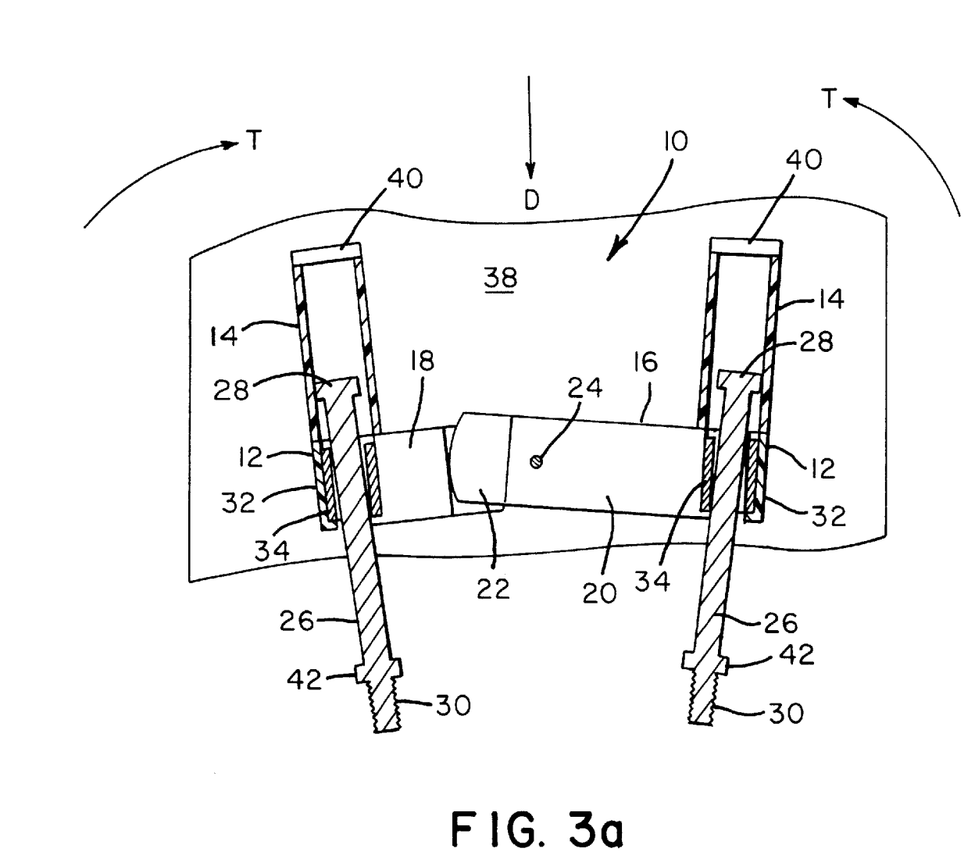
FIG. 3a is a longitudinal cross-sectional view of the new and improved automotive vehicle headrest system illustrated in FIG. 2, as taken along the line 3a–3a of FIG. 2, and showing the bracket members of the system disposed in their normal disposition with respect to each other and prior to the threaded engagement or mounting of the support shafts or bolt members within the upper region of the automotive vehicle seat frame.
Figure 3B:
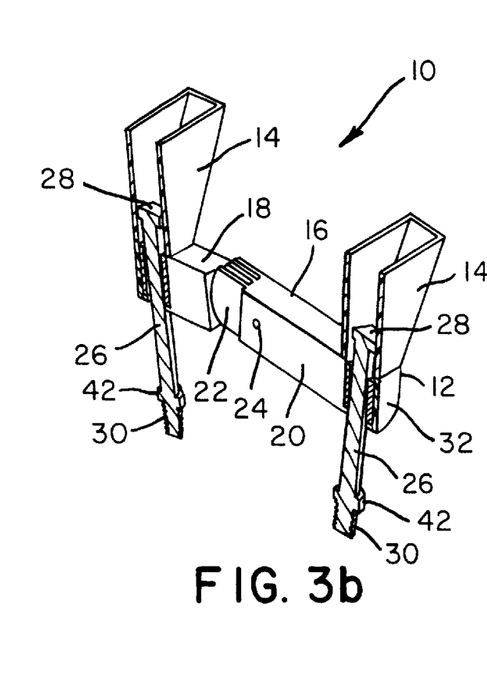
FIG. 3b is a perspective view, of the automotive headrest system of the present invention, which corresponds to the cross-sectional view of the headrest system as illustrated in FIG. 3a, with the headrest member removed.

Each one of the upstanding ears or channel portions 14 of the bracket members 12 is hollow and has a substantially trapezoidal configuration, the purpose of which will become apparent shortly hereafter. Each horizontally extending base or central portion 16 has a substantially L-shaped configuration, as may be considered in a horizontal cross-sectional view, which comprises a relatively short leg 18 and a relatively long leg 20, and the horizontally extending base or central portions 16 of the bracket assembly are identical to each other such that a single manufactured component can be utilized upon either one of the left or right sides of the bracket assembly. In addition, the base or central portions 16,16 are disposed in a back-to-back arrangement with respect to each other, and each one of the relatively short and long leg portions 18 and 20 of each base or central portion 16 of each bracket member 12 is provided with an array or series of transversely spaced fingers 22. The finger portions 22 of each base or central portion 16 of each bracket member 12 are adapted to be mated together in an interdigitated arrangement, and the base or central portions 16 of the bracket members 12 are pivotally interconnected by means of such interdigitated sets of fingers 22,22 and a pivot pin 24. In this manner, the bracket members 12 can be pivotally moved with respect to each other between a first position as shown in FIG. 1 wherein the horizontally extending base or central portions 16,16 are substantially aligned with respect to each other, and a second position as shown in FIGS. 3*a* and 3*b* wherein the base or central portions 16,16 are misaligned or disposed in a somewhat skewed arrangement with respect to each other, the purposes for which will become apparent hereinafter.

In order to mount the bracket members 12,12, which are an integral component of, and support, a headrest component or member of the automotive vehicle headrest system 10, as will become more apparent hereinafter, upon an upper portion of an automotive vehicle seat frame, not shown, the automotive vehicle headrest system 10 further comprises a pair of upstanding support shafts or bolt members 26 which are respectively provided with a head portion 28 upon an uppermost end portion thereof, and a threaded portion 30 upon a lowermost end portion thereof. The automotive vehicle seat frame, not shown, is provided with threaded socket or recess portions, or threaded sleeve members, for threadedly receiving the lower threaded end portions 30 of the upstanding support shafts or bolt members 26 such that the upstanding support shafts or bolt members 26 are fixedly mounted within the uppermost region of the automotive vehicle seat frame when the lower threaded end portions 30 of the upstanding support shafts or bolt members 26 are threadedly engaged within the noted threaded sockets, recesses, or sleeves of the automotive vehicle seat frame.

Figure 1:
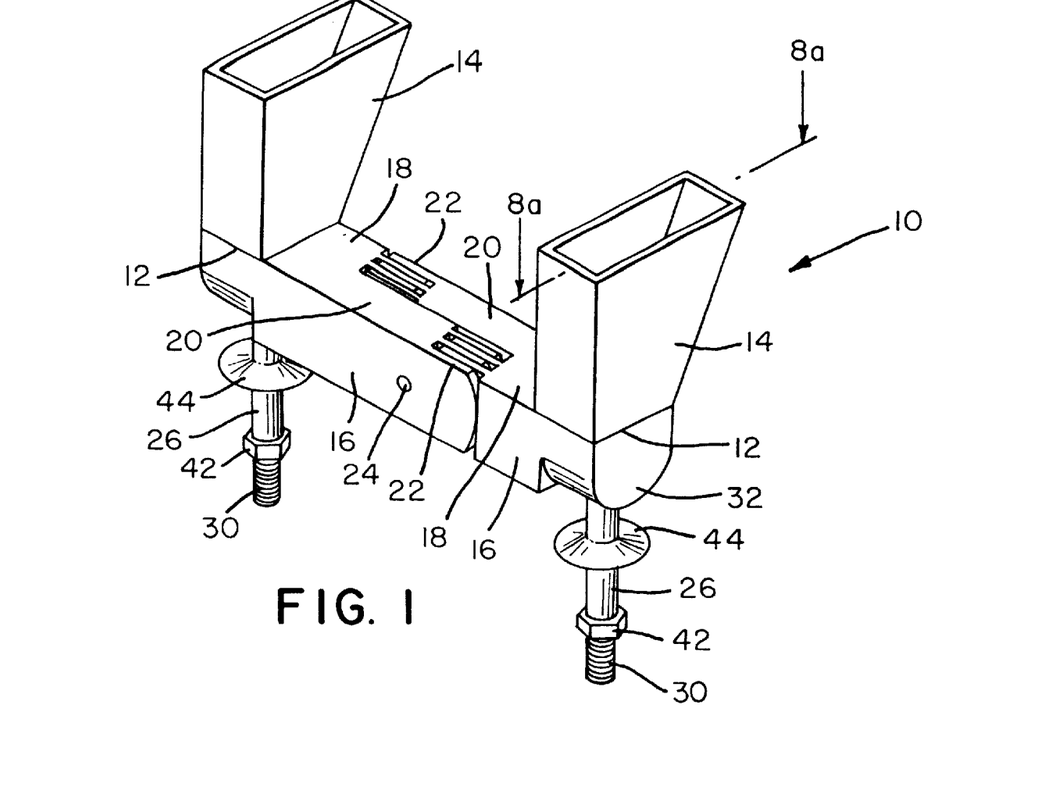
FIG. 1 is a perspective view of a first embodiment of a new improved automotive vehicle headrest system constructed in accordance with the principles and teachings of the present invention and showing the cooperative parts thereof.
Figure 2:
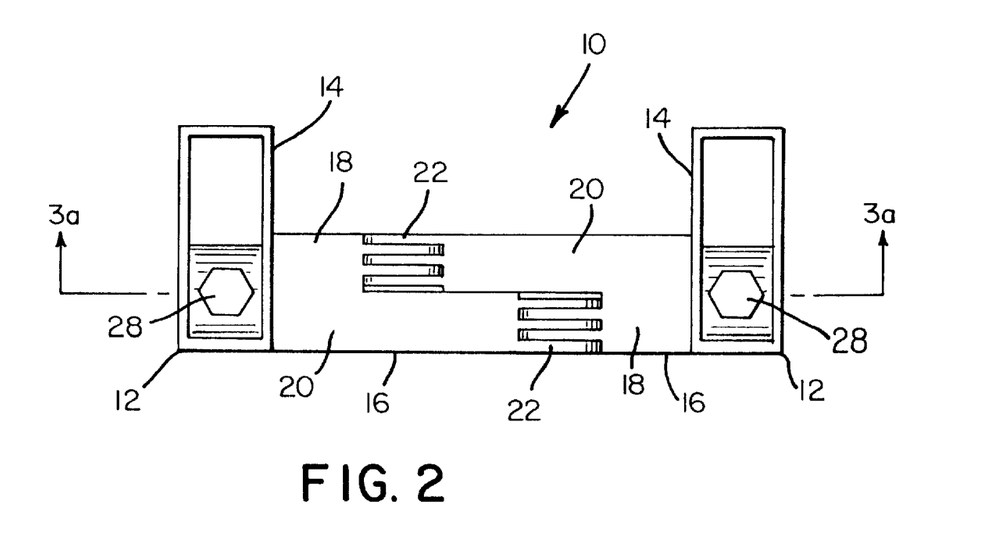
FIG. 2 is a top plan view of the new and improved automotive vehicle headrest system illustrated in FIG. 1.
Figure 5:
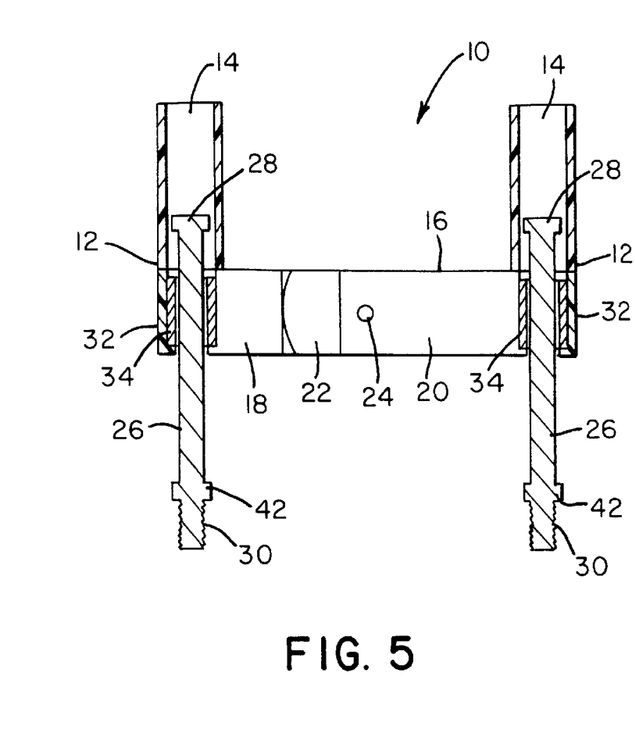
FIG. 5 is a cross-sectional view similar to that of FIG. 3a of the drawings showing, however, the bracket members of the headrest system disposed in their relatively aligned positions so as to permit the bracket members, and the headrest component or member operatively connected to the bracket members, to be vertically adjusted to an intermediate elevational position, with respect to the support shafts or bolt members, as illustrated.
Figure 6:
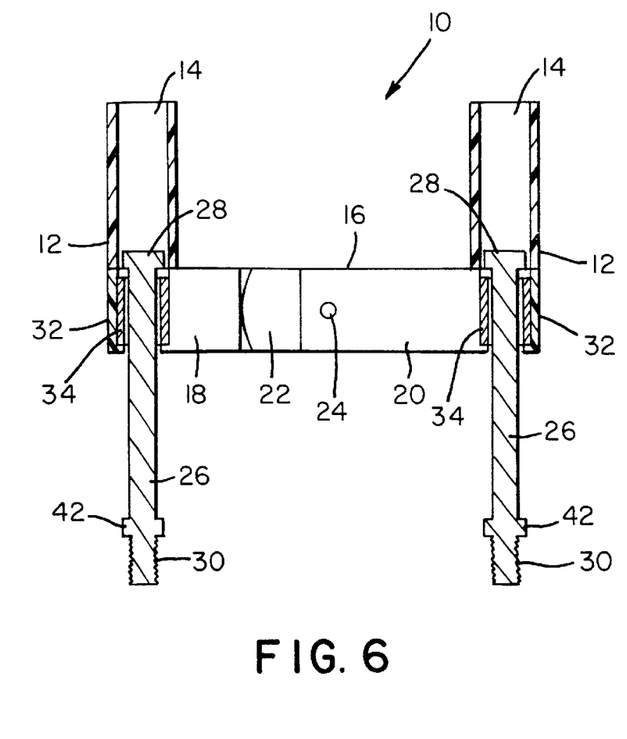
FIG. 6 is a cross-sectional view similar to that of FIG. 5 showing, however, the bracket members of the headrest system moved to a fully extended or uppermost elevational position, with respect to the support shafts or bolt members, as illustrated.
Figure 7:
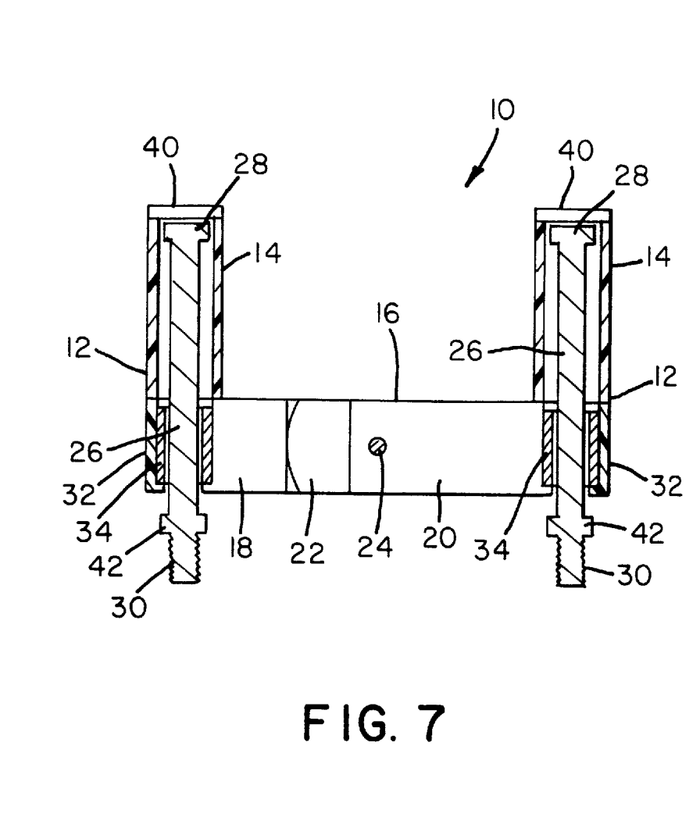
FIG. 7 is a cross-sectional view similar to that of FIGS. 5 and 6 showing, however, the bracket members of the headrest system moved to a fully retracted or lowermost elevational position with respect to the support shafts or bolt members, as illustrated.
Figure 8A:
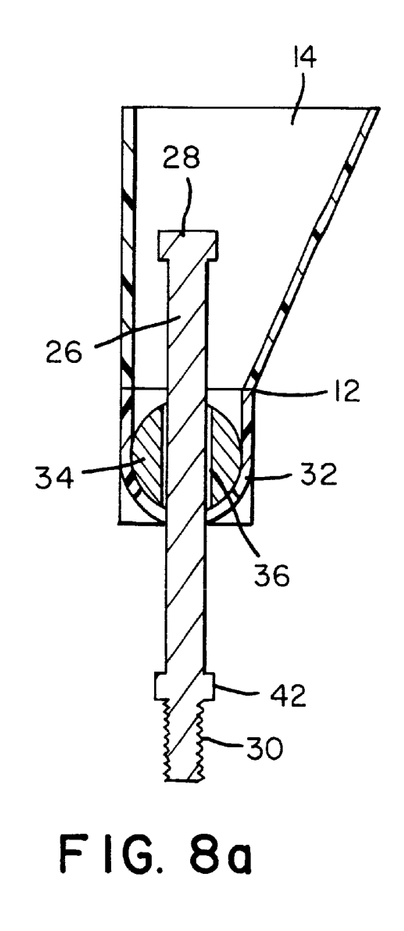
FIG. 8a is a partial transverse cross-sectional view of the new and improved automotive vehicle headrest system of the present invention as illustrated in FIG. 1, as taken along the line 8a–8a of FIG. 1, and showing one of the bracket members, and therefore the headrest component or member operatively connected thereto, disposed in a normal upright, non-pivoted position or angular orientation.
Figure 8B:
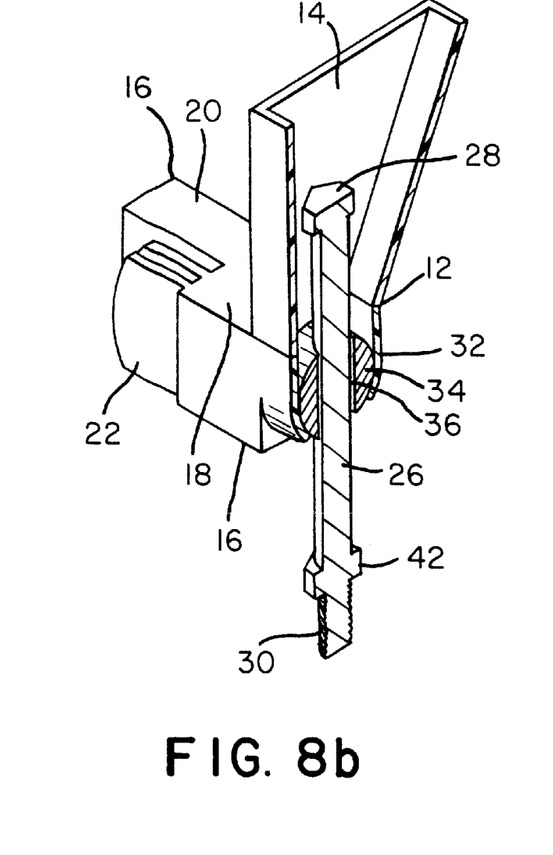
FIG. 8b is a perspective view of the bracket member of FIG. 8a showing the bracket member disposed in the normal upright, non-pivoted position or angular orientation.
Figure 9A:
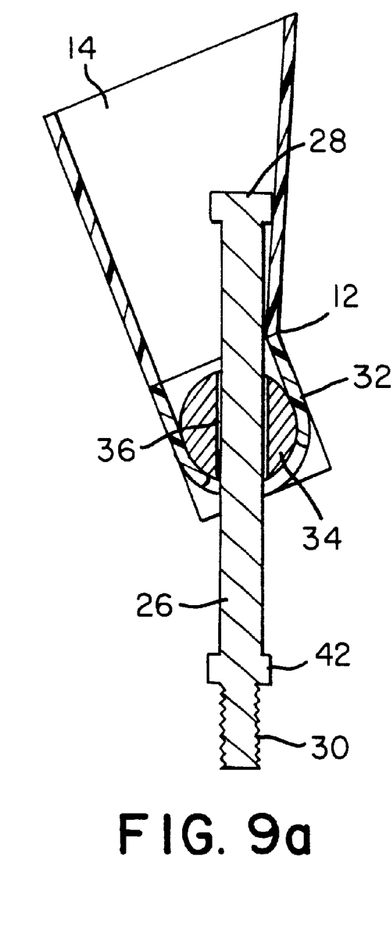
FIG. 9a is a partial transverse cross-sectional view similar to that of FIG. 8a showing, however, the bracket member pivoted rearwardly relative its associated upstanding support shaft or bolt member to a fully pivoted position or angular orientation so as to permit the headrest component or member operatively connected to the bracket member to be pivoted rearwardly to a tilted or inclined position or orientation as may be desired by the automotive vehicle driver or passenger.
Figure 9B:
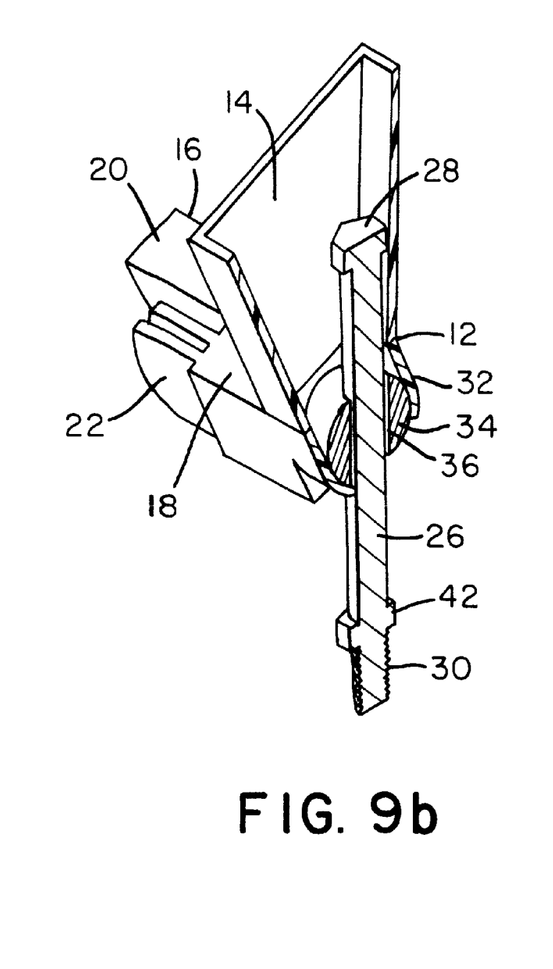
FIG. 9b is a perspective view similar to that of FIG. 8b showing, however, the bracket member of FIG. 9a as disposed in the rearwardly pivoted, tilted, or inclined position or orientation.

In addition, as best seen from FIG. 1, as well as a result of additional reference being made to FIGS. 8*a* and 8*b*, each lower external corner portion of each bracket member 12 is provided with a substantially semi-circular housing portion 32, and a circular disk 34 is rotatably or pivotably mounted within the housing portion 32 about a horizontal axis. Each disk 34 is provided with a diametrically extending slot 36 which has a greater diametrical extent or dimension than the diametrical extent or thickness dimension of each upstanding support shaft or bolt member 26 so as to permit the shank portion of each upstanding support shaft or bolt member 26 to be loosely disposed therein and to be substantially vertically movable therethrough. In this manner, the bracket members 12, and the associated automotive vehicle headrest component or member, schematically illustrated at 38 in FIG. 3*a*, are able to be vertically moved and positionally adjusted upwardly and downwardly with respect to the automotive vehicle seat as a result of the relative translational or linear movement permitted between the respective disk members 34 and the shank portions of the upstanding bolt members or support shafts 26. FIGS. 5–7 respectively show the bracket members 12,12 at various different intermediate, fully raised, and fully lowered vertical positions with respect to the upstanding support shafts or bolt members 26,26, with the fully raised position of the bracket members 12,12 being determined by means of the engagement of the upper head portions 28,28 of the support shafts or bolt members 26,26 engaging the upper ends of the disk members 34,34 as seen in FIG. 6, while the fully lowered position of the bracket members 12,12 is determined by means of the upper head portions 28,28 of the support shafts or bolt members 12,12 engaging cap members 40,40 respectively mounted upon the upper ends of the ear or channel portions 14,14 of the bracket members 12,12. In addition, as shown in FIGS. 8*a*–9*b*, the bracket members 12,12 and the associated automotive vehicle headrest component or member 38 are able to be pivotally moved and angularly adjusted forwardly and backwardly with respect to the automotive vehicle seat so as to attain predetermined or desired angular orientations with respect to the automotive vehicle seat as a result of the relative pivotal movement permitted between the bracket member housing portions 32,32 and the disk members 34,34.

The bracket members 12,12 may be fabricated from a suitable synthetic plastic resin material which exhibits a predetermined amount of inherent resiliency and each bracket member 12 may be provided with a suitable detent or dimple, not shown, within the vicinity of the border or interface separating the upstanding ear or channel portion 14 from the disk housing portion 32. Accordingly, each disk member 34 may be snap-fittingly engaged and retained within its respective bracket housing portion 32 after being inserted into its respective upstanding ear or channel portion 14 and being moved downwardly within the bracket member 12 so as to pass over the noted retaining detent or dimple and into the housing portion 32. In order to provide for the aforenoted angular positional or orientational adjustment of the bracket members 12,12 with respect to the disk members 34,34 and the upstanding support shafts or bolt members 26,26, as illustrated in FIGS. 8*a*–9*b*, the oppositely disposed flat or planar surfaces of the disk members 34,34, and the similarly flat or planar interior sidewall surfaces of the bracket housing portions 32,32 may be similarly provided with detents, dimples, ribs, or the like, also not shown, whereby the bracket members 12,12 and the headrest component or member 38 connected thereto may be pivotally moved or adjusted as desired in a stepwise manner to a predetermined angular orientation with respect to the automotive vehicle seat. It is also noted that the particular trapezoidal cross-sectional configuration of the ear or channel portions 14,14 permits, facilitates, and limits or defines the range of pivotal or angular movements or orientations of the bracket members 12,12, and the automotive vehicle headrest component or member 38 attached thereto, relative to the automotive seat and between the essentially upright position or orientation illustrated in FIGS. 8*a* and 8*b,* and the rearwardly pivoted or tilted position or orientation illustrated in FIGS. 9*a* and 9*b.*

In order to achieve the vertically adjustable positions of the bracket members 12,12, and the associated automotive headrest component or member 38 operatively connected thereto, with respect to the upstanding support shafts or bolt members 26,26 fixedly mounted within the automotive vehicle seat frame by means of the lower threaded end portions 30 thereof, the automotive vehicle headrest system 10 of the present invention embodies and comprises a unique interrelated arrangement of the bracket members 12,12, the disk members 34,34, and the upstanding support shafts or bolt members 26, 26. More particularly, commencing with a description of the present invention which is to be considered in connection with FIG. 3*a,* the headrest system 10 includes the headrest component or member 38 which is fabricated by suitable molding techniques or the like so as to in effect fixedly embed the bracket members 12,12 therewithin in such a manner that the horizontally extending base or central portions 16,16 of the bracket members 12,12 are disposed in a misaligned or inclined orientation with respect to each other. The headrest component or member 38 may comprise any one of various different flexibly resilient elastic materials, exhibiting a predetermined amount of inherent structural memory, including, but not limited to, a suitable foam, nylon, polypropylene, an elastomer, urethane, other thermoplastic or synthetic resin materials, or suitable compositions thereof, with the critical or essential factor being that once the headrest component or member 38 is so fabricated, the bracket members 12,12 are disposed with respect to each other in the noted and illustrated orientation. Suitable fabric, cloth, leather, or the like, not actually shown, can of course be applied over the basic structure comprising the headrest component or member 38 so as to render the outward appearance of the headrest component or member 38 compatible with the interior decor of the automotive vehicle passenger cabin.

The provision or disposition of the aforenoted cap members 40,40 upon the upper ends of the ears or channel portions 14,14 of the bracket members 12,12 also serves to seal the upper ends of the ears or channel portions 14,14 of the bracket members 12,12 and prevent the material, for example, a suitable foam material, from which the headrest component or member 38 is fabricated, from entering the upper ends of the ears or channel portions 14,14 of the bracket members 12, 12 whereby the otherwise hollow ears or channel portions 14, 14 would then be filled with such foam material which would then interfere with the desired relative vertical movement of the upper head end portions 28, 28 of the support shafts or bolt members 26,26 within the ears or channel portions 14,14 of the bracket members 12,12 when vertical adjustment of the bracket members 12,12, and the associated headrest component or member 38, is desired as has been previously described in connection with FIGS. 5–7. Other sealing means, not shown, may likewise be provided in connection with the lower ends of the bracket members 12,12 through which the support shafts or bolt members 26,26 extend so as to likewise prevent infiltration of the material from which the headrest component or member 38 is fabricated.

It will be noted from reference being made to FIG. 3*a* that when the headrest component or member 38 is fabricated as has been described and as illustrated, that the longitudinally or substantially vertically extending support shafts or bolt members 26,26 are inclined somewhat in a convergent mode toward each other as one proceeds in the direction extending from the upper head portions 28,28 to the lower threaded end portions 30,30. However, when the support shafts or bolt members 26,26 are to be threadedly engaged within the automotive vehicle seat frame, not shown, by means of the lower threaded end portions 30,30 thereof, the lower threaded end portions 30,30 of the support shafts or bolt members 26,26 must be moved divergently away from each other such that the support shafts or bolt members 26,26 will then be disposed parallel to each other so as to in fact permit the lower threaded end portions 30,30 thereof to be threadedly engaged within the threaded sockets, recesses, or sleeves, not shown, of the automotive vehicle seat frame.

In order to facilitate or permit the upstanding support shafts or bolt members 26,26 to in fact be threadedly engaged within the threaded sockets, recesses, or sleeve members, not shown, of the automotive vehicle seat frame, nut members 42,42 are respectively provided upon the support shafts or bolt members 26,26 at positions immediately above the threaded portions 30,30. The nut members 42,42 may comprise lock nuts fixedly secured upon the support shafts or bolt members 26,26, or the nut members 42,42 may comprise conventional nuts welded onto the shafts or bolts 26,26, or still further, the nut members 42,42 may be integrally formed upon shafts or bolts 26,26 during fabrication thereof. The nut members 42,42 must be provided upon externally accessible regions of the shafts or bolts 26,26, so as to permit rotation of the latter by means of a suitable wrench or other driving tool in order to threadedly engage the lower threaded end portions 30,30 within the threaded recesses, sockets, or sleeve members of the automotive vehicle seat frame, because the headed end portions 28,28 of the shafts or bolts 26,26 are not readily externally accessible due to their disposition within the bracket members 12,12 which are of course embedded within the foamed or molded headrest component 38. As additionally seen in FIG. 1, the shafts or bolts 26,26 are also provided with vertically movable escutcheon plates or the like 44,44 which are slidably movable along the shafts or bolts 26,26 so as to cover the nut members 42,42, in order to provide a pleasing appearance to the completed headrest assembly once the lower threaded end portions 30,30 are threadedly engaged within the threaded sockets, recesses, or sleeve members of the automotive vehicle seat frame.

The aforenoted divergent movement of the lower threaded end portions 30,30 of the support shafts or bolt members 26,26 with respect to each other is permitted by means of the relatively loose disposition of the shank portions of the support shafts or bolt members 26,26 within the disk members 34,34 as permitted or defined by means of the aforenoted disparity between the diametrical dimensions of the support shafts or bolt members 26,26 and the slots 36,36 of the disk members 34,34. Such divergence of the lower threaded end portions 30,30 of the support shafts or bolt members 26,26, and the resulting parallel disposition of the support shafts or bolt members 26,26 also occurs without affecting the misaligned disposition of the horizontally extending base or central portions 16,16 of the bracket members 12,12. As a result of such relative dispositions of the various components of the headrest system 10 of the present invention, the substantially horizontally extending but somewhat inclined axes H of the base or central portions 16,16 of the bracket members 12, 12 will not actually be perpendicular to the longitudinal vertical axes V of the support shafts or bolt members 26,26 but will be slightly askew with respect thereto as seen in FIGS. 4*a* and 4*b.*

Figure 4A:
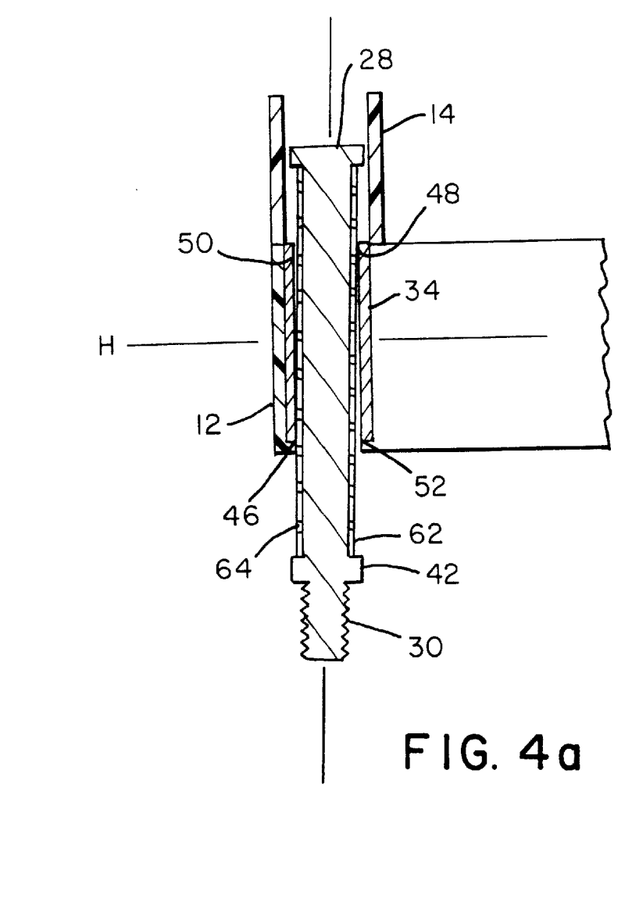
FIGS. 4a and 4b are cross-sectional views, respectively, of the left and right side support shafts or bolt members as mounted within the pivotable disk members of the upstanding bracket members of the headrest system of the present invention as shown in FIG. 3a, schematically illustrating the two-point contact developed between the bolt members or support shafts and their associated disk members when the support shafts or bolt members have been threadedly engaged within the upper region of the automotive vehicle seat frame and the vehicle headrest member has been vertically moved relative to the support shafts or bolt members to a vertically adjusted position.
Figure 4B:
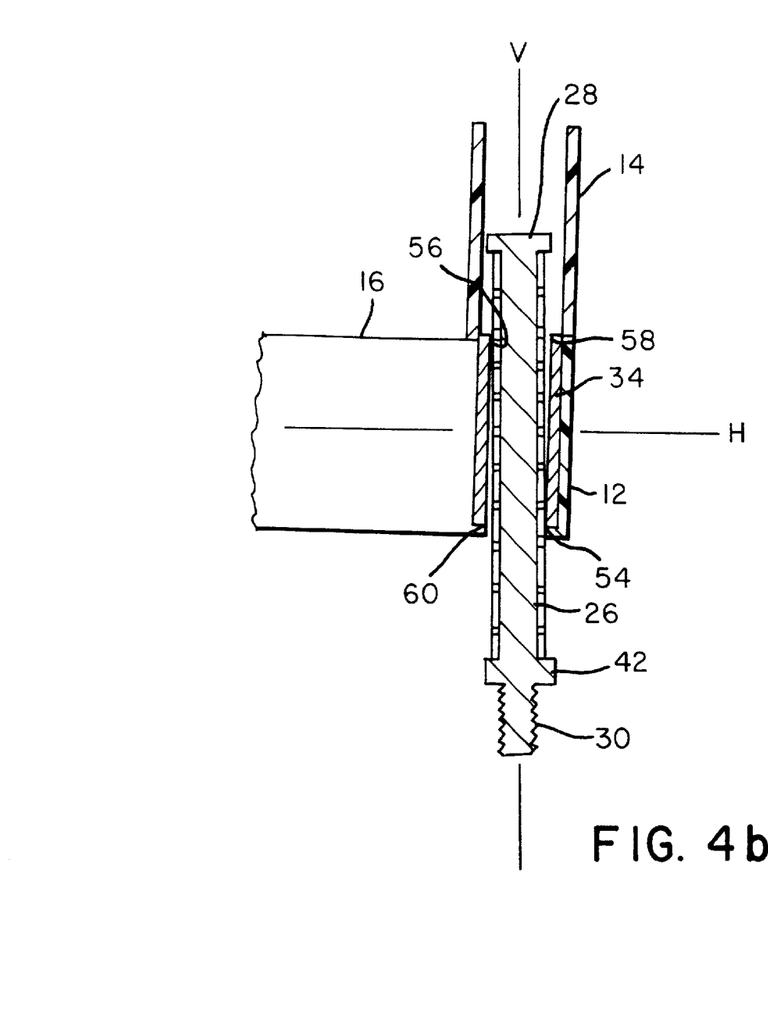

In this manner, as seen in FIG. 4a, the left bracket member 12, and the left disk member 34 disposed therein, will establish a two-point contact with the left upstanding support shaft or bolt member 26 such that contact is established between a lower shank portion of the left bolt or shaft 26 and the lower left corner or edge portion 46 of the left disk member 34, as well as between an upper shank portion of the left shaft or bolt 26 and the upper right corner or edge portion 48 of the left disk member 34. The upper left corner or edge portion 50 of the left disk member 34, as well as the lower right corner or edge portion 52 of the left disk member 34, are spaced from and not in contact with the left support shaft or bolt member 26. In a similar manner, the right bracket member 12, and the right disk member 34 disposed therein, will likewise establish a two-point contact with the right upstanding support shaft or bolt member 26 such that contact is established between a lower shank portion of the right shaft or bolt 26 and the lower right corner or edge portion 54 of the right disk member 34, as well as between an upper shank portion of the right shaft or bolt 26 and the upper left corner or edge portion 56 of the right disk member 34. The upper right corner or edge portion 58 of the right disk member 34, as well as the lower left corner or edge portion 60 of the right disk member 34, are spaced from and not in contact with the right support shaft or bolt member 26.

In order to provide the predetermined elevational incremental positional adjustments of the headrest member or component 38 as noted hereinbefore, the upstanding support shafts or bolt members 26,26 are provided with a detent system or arrangement which effectively cooperates with the noted corner or edge portions of the disk members 34,34. More particularly, with continued reference being made to FIGS. 4a and 4b, the external peripheral surface of the shank portion of each support shaft or bolt member 26, as defined between the head portion 28 and the nut member 42, is provided with an annular sleeve or tube member 62 which includes a plurality of detent members 64 integrally formed thereon in a vertical array. Consequently, the detent members 64 can cooperate with the corner or edge portions of the disk members 34,34 so as to determine the adjusted elevational positions of the bracket members 12,12, their associated disk members 34,34, and therefore the headrest component or member 38, with respect to the support shafts or bolt members 26,26 such that the headrest component or member 38 can in fact attain the variously desired elevational positions as disclosed, for example, within FIGS. 5–7. The sleeve or tube member 62 can be fabricated in two semi-cylindrical portions and subsequently fitted about the shank portion of its associated bolt or shaft 26, or alternatively, the detent members 64 can in effect be integrally formed upon the outer periphery of each shank portion of each shaft or bolt member 26.

In order to in fact achieve vertical elevational adjustment of the headrest component or member 38 with respect to the automotive vehicle seat as may be desired by the automotive vehicle driver or passenger, the detented engagement defined between the detent members 64 of the support shaft sleeves 62,62 and the corner or edge portions of the disk members 34, 34 must be, in effect, disengaged, so as to permit the headrest component or member 38 to be moved to a new elevational position, and then re-engaged with the corner or edge portions of the disk members 34,34 so as to maintain the headrest component or member 38 at the selected elevational position.

Vertically downward positional adjustment of the headrest component or member 38 is easily achieved in accordance with the system of the present invention by simply exerting a downward force upon the central portion of the headrest component or member 38 as noted by the arrow D in FIG. 3a, or alternatively or concomitantly, exerting oppositely directed forces T,T upon the opposite ends of the headrest component or member 38. In either case, such forces will cause flexion of the headrest component or member 38 whereby the horizontally extending central portions 16,16 of the bracket members 12,12 will be moved from their relatively misaligned positions of FIGS. 3a–4b to their aligned position with respect to each other as shown in FIGS. 5–7. In this manner, the disk members 34,34 will no longer be askewed or inclined with respect to the support shafts or bolt members 26,26 but will be coaxially aligned therewith whereby the corner or edge portions of the disk members 34,34 will be disengaged from the detents 64 of the support shafts or bolt members 26,26, and the headrest component or member 38, through means of its bracket members 12,12 and the disk members 34,34 operatively associated therewith, can be elevationally adjusted to a newly desired or selected position. Upon attaining such newly desired elevational position, the forces impressed upon the headrest component or member 38, in the directions of arrows D and/or T,T, are removed and the elasticity, flexibility, resilience, and memory of the particular material from which the headrest component or member 38 is fabricated or molded about the bracket members 12,12 will cause the bracket members 12,12 to return to their relatively misaligned or non-aligned positions shown in FIGS. 3a–4b whereby the disk members 34,34 will again engage the detents 64 of the support shafts or bolt members 26,26.

Vertically upward positional adjustment of the headrest component or member 38 may be achieved in a manner similar to that described immediately hereinabove in connection with the vertically downward positional adjustment of the headrest component or member 38, that is, forces similar to those applied in the noted directions D and T,T may also be applied in connection with the vertically upward positional adjustment of the headrest component or member 38 so as to again simply release the detent engagement of the corner or edge portions of the disk members 34,34 with the detents 64 of the support shafts or bolt members 26,26. However, an easier mode of operation is also contemplated in that only one of the forces needs to be applied to one of the sides of the headrest component or member 38 in the direction of one of the arrows T, at any one time, so as to simply disengage the detent engagement defined between that particular one of the disk members 34,34 and its associated shaft or bolt member 26. That side of the headrest component or member 38 may then be vertically adjusted upwardly in a stepwise manner, and then the other side of the headrest component or member can be similarly adjusted or moved in an alternative stepwise manner until the headrest 38 has been positioned at the desired elevational position. It may also be possible that by disengaging one of the disk members 34,34 from its associated shaft or bolt member 26,26 by means of the one force T applied to one side of the headrest 38, the opposite side of the headrest 38 may be vertically movable without an additional force T being applied thereto in view of the fact that the dimensional disparity defined between the disk members 34,34 and the shaft or bolt members 26,26 is sufficient to permit disengagement of such opposite side disk member 34 from the opposite side shaft or bolt member 26.

Figure 10:
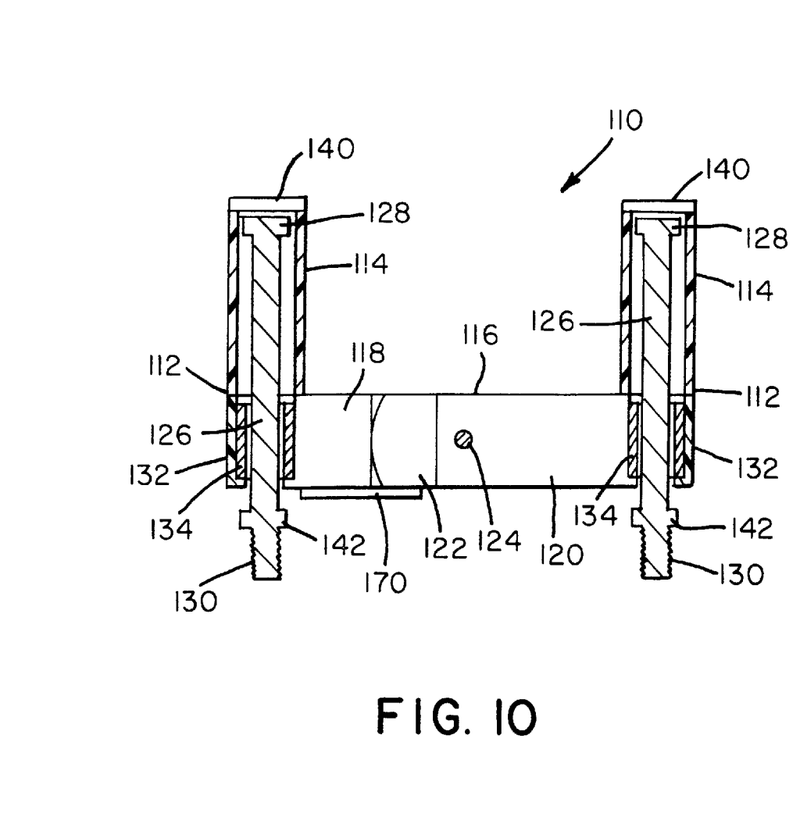
FIG. 10 is a cross-sectional view similar to that of FIG. 7 showing, however, a second embodiment of a new and improved automotive vehicle headrest system constructed in accordance with the principles and teachings of the present invention and showing the cooperative parts thereof.

With reference now being made to FIG. 10 of the drawings, a second embodiment of the new and improved automotive vehicle headrest system constructed in accordance with the principles and teachings of the present invention is disclosed and generally indicated by the reference character 110. It is to be noted that the structural components or members of this embodiment are essentially the same as those of the previously discussed embodiment of the present invention, except when or how so noted, and therefore, like or corresponding parts of such embodiment are denoted by similar reference characters except that such reference characters will be in the 100 series. The embodiment comprising the headrest system 110 is of a type which is not intended to be fabricated as an integral component or assembly encased within a premolded headrest, such as that illustrated at 38 in FIG. 3a, but to the contrary, may comprise an independent component which may subsequently be incorporated within a headrest component or member similar to that of headrest 38. Such a headrest component, for example, may have a recessed or pocket region defined therein such that the headrest system 110 can then be inserted into such pocket or recessed portion of the headrest component.

Consequently, in view of the fact that the headrest system 110 will not be integrally encased or embedded within the aforenoted flexibly resilient headrest 38 whereby the horizontally extending central bracket portions 16 will not be readily able to be normally disposed at their relatively misaligned positions with respect to each other as shown in FIGS. 3a–4b, means must be provided upon the bracket members 112,112 per se in order to dispose the horizontally extending central portions 116,116 thereof at their relatively misaligned positions with respect to each other, and in addition which will permit the bracket portions 116,116 to return to such normal misaligned positions once the bracket portions 116,116 are disposed in their relatively aligned positions attendant vertical adjustment of the headrest in a mode similar to that described in connection with the first embodiment of the headrest system 10 of the present invention. Such means may comprise, for example, a plurality or series of leaf springs 170 which are affixed to the lower surface portions of each short leg 118 of the bracket portions 116,116 and which respectively engage a lower surface portion of each finger 122 of the long leg 120 of the other bracket portion 116. Consequently, when the aforenoted forces are impressed upon the bracket members 112,112, the bracket portions 116, 116 will be moved from their relatively misaligned dispositions to their relatively aligned dispositions, as shown in FIG. 10, against the biasing forces of the leaf spring members 170, the headrest component or member can be suitably vertically adjusted as desired, and upon removal of such impressed forces from the headrest and the associated bracket members 112,112, the leaf springs 170 will cause the bracket portions 116,116 to again regain their misaligned dispositions with respect to each other so as to retain the headrest in the particularly chosen elevated position.

Thus it may be seen that in accordance with the principles and teachings of the present invention, there has been disclosed a new and improved automotive vehicle headrest system which is readily and easily movable and adjustable with respect to upstanding support shafts or bolt members fixedly mounted within the upper region or portion of the automotive vehicle seat frame. The disparity between the diametrical dimensions of the shafts or bolts and their associated disk members of the mounting brackets facilitates assembly and operation of the system without regard to close tolerance requirements during manufacture and assembly, and in addition, such interrelated structure establishes or defines the two-point contact assembly which simplifies elevational adjustment of the headrest component as desired.

Obviously, many modifications and variations of the present invention are possible in light of the above teachings. It is therefore to be understood that within the scope of the appended claims, the present invention may be practiced otherwise than as specifically described herein.

What is new and desired to be secured by Letters Patent of the United States of America is:

1. An automotive vehicle headrest system, comprising:

a headrest component;

a pair of upstanding support shafts defining first vertical axes, having means defined upon lower end portions thereof for fixedly mounting said pair of upstanding support shafts within an upper region of an automotive vehicle seat, and having upper end portions disposed within said headrest component; and bracket means defined between said headrest component and said upper end portions of said pair of upstanding support shafts and defining second substantially vertical axes which are movable into and out of coaxial alignment with respect to said first vertical axes of said pair of upstanding support shafts for supporting said headrest component in a vertically adjustable manner upon said upstanding support shafts such that when said second substantially vertical axes of said bracket means are not coaxial with said first vertical axes of said pair of upstanding support shafts, said headrest component is positionally maintained at a particularly desired vertical position with respect to said pair of upstanding support shafts for the automotive seat, whereas when said second substantially vertical axes of said bracket means are coaxial with said first vertical axes of said pair of upstanding support shafts, said headrest component can be vertically moved with respect to said pair of upstanding support shafts for the automotive vehicle seat so as to be vertically adjustable to different elevational positions with respect to said pair of upstanding support shafts for the automotive vehicle seat.

2. A system as set forth in claim 1, further comprising:

additional means defined between said headrest component and said upper end portions of said pair of upstanding support shafts for pivotally supporting said headrest component in a positionally adjustable manner upon said upstanding support shafts such that said headrest component can be pivotally adjusted to different angular orientations with respect to said pair of upstanding support shafts for the automotive vehicle seat.

3. A system as set forth in claim 1, wherein:

said bracket means comprises a pair of bracket means disposed within said headrest component; and detent means are defined upon said pair of upstanding support shafts for cooperating with said pair of bracket means.

4. A system as set forth in claim 3, wherein:

said pair of bracket means are disposed within said headrest component so as to be movable between a first normal position at which said pair of bracket means are misaligned with respect to each other so as to have a portion thereof disposed in engagement with said detent means of said pair of upstanding support shafts and thereby permit said headrest component to be supported at a predetermined elevational position with respect to said pair of upstanding support shafts for the automotive vehicle seat, and a second position at which said pair of bracket means are aligned with respect to each other so as to have said portion thereof disengaged from said detent means of said pair of upstanding support shafts so as to permit said headrest component to be movably adjusted to a desired elevational position with respect to said pair of upstanding support shafts for the automotive vehicle seat.

5. A system as set forth in claim 4, further comprising:

means for biasing said pair of bracket means toward said first normal position.

6. A system as set forth in claim 5, wherein:

said biasing means comprises said headrest component being fabricated from an elastically flexible, resilient material having predetermined memory; and said pair of bracket means are encapsulatingly embedded within said material comprising said headrest component.

7. A system as set forth in claim 5, wherein:

said biasing means comprises spring means.

8. A system as set forth in claim 7, wherein:

said spring means comprises leaf spring members mounted upon one of said pair of bracket means and engaging the other one of said pair of bracket means.

9. A system as set forth in claim 4, wherein:

said pair of bracket means are disposed in contact with said detent means of said pair of upstanding support shafts at two vertically separated, diametrically opposite points when said pair of bracket means are misaligned with respect to each other and are engaged with said detent means of said pair of upstanding support shafts.

10. A system as set forth in claim 4, wherein:

said pair of bracket means comprise a pair of disk members which are disposed in contact with said detent means of said pair of upstanding support shafts at two vertically separated, diametrically opposite points when said pair of bracket means, and said pair of disk members, are misaligned with respect to each other and are engaged with said detent means of said pair of upstanding support shafts.

11. A system as set forth in claim 3, wherein:

said pair of bracket means comprise identical, positionally reversible and interchangeable parts.

12. A system as set forth in claim 3, wherein:

said pair of bracket means are pivotally connected to each other and comprise finger portions which are disposed in an interdigitated arrangement with respect to each other.

13. A system as set forth in claim 2, wherein:

said bracket means comprises a pair of bracket means disposed within said headrest component;

said additional means comprises a pair of disk members respectively disposed within said pair of bracket means and mounted upon said upstanding support shafts; and detent means are defined upon said pair of upstanding support shafts for cooperating with said pair of disk members.

14. A system as set forth in claim 13, wherein said additional means comprises:

means pivotally mounting said pair of disk members within said pair of bracket means so as to permit said pair of bracket means and said headrest component to pivot between selected ones of said different angular orientations with respect to the automotive vehicle seat.

15. A system as set forth in claim 14, wherein:

said pair of bracket means comprise upstanding ear portions having substantially trapezoidal cross-sectional configurations for limiting pivotal movement of said pair of bracket means and said headrest component between two extreme angular positions.

16. An automotive vehicle headrest system, comprising:

a headrest component;

a pair of upstanding support shafts defining first vertical axes, having means defined upon lower end portions thereof for fixedly mounting said pair of upstanding support shafts within an upper region of an automotive vehicle seat, and having upper end portions thereof disposed within said headrest component; and a pair of bracket means defining second substantially vertical axes and disposed within said headrest component so as to be movable between a first position at which said second substantially vertical axes of said pair of bracket means are not coaxial with said first vertical axes of said pair of upstanding support shafts and said pair of bracket means have portions thereof disposed in engagement with said pair of upstanding support shafts so as to thereby permit said headrest component to be supported and positionally maintained at a predetermined elevational level with respect to said pair of upstanding support shafts for the automotive vehicle seat, and a second position at which said second substantially vertical axes of said pair of bracket means are coaxial with said first vertical axes of said pair of upstanding support shafts and said pair of bracket means have said portions thereof disengaged from said pair of upstanding support shafts so as to thereby permit said headrest component to be movably adjusted to a desired elevational position with respect to said pair of upstanding support shafts for the automotive vehicle seat.

17. A system as set forth in claim 16, wherein:

said pair of bracket means are misaligned with respect to each other at said first position, and are disposed in alignment with respect to each other at said second position; and means operatively connected to said pair of bracket means for biasing said pair of bracket means toward said first position.

18. A system as set forth in claim 17, further comprising:

a pair of disk members respectively pivotally disposed within said pair of bracket means and mounted upon said pair of upstanding support shafts for permitting said pair of bracket means and said headrest component to pivot between selected ones of different angular orientations with respect to the automotive vehicle seat.

19. A system as set forth in claim 18, wherein:

said pair of disk members are disposed in contact with said pair of upstanding support shafts at two vertically separated, diametrically opposite points when said pair of bracket means, and said pair of disk members, are misaligned with respect to each other and are engaged with said pair of upstanding support shafts.

20. A system as set forth in claim 18, wherein:

said pair of bracket means comprise upstanding ear portions having substantially trapezoidal cross-sectional configurations for limiting pivotal movement of said pair of bracket means and said headrest component between two extreme angular positions.

* * * * *